(12) United States Patent
Wienicke et al.

(10) Patent No.: US 8,166,610 B2
(45) Date of Patent: May 1, 2012

(54) SPRING HINGE

(75) Inventors: Frank Wienicke, Birkenfeld (DE); Ulrich Wannenmacher, Karlsdorf (DE)

(73) Assignee: Obe Ohnmacht & Baumgärtner GmbH & Co. KG, Ispringen (DE)

( * ) Notice: Subject to any disclaimer, the term of this patent is extended or adjusted under 35 U.S.C. 154(b) by 257 days.

(21) Appl. No.: 12/600,812

(22) PCT Filed: Apr. 18, 2008

(86) PCT No.: PCT/EP2008/003131
§ 371 (c)(1), (2), (4) Date: Nov. 18, 2009

(87) PCT Pub. No.: WO2008/087050
PCT Pub. Date: Jul. 24, 2008

(65) Prior Publication Data
US 2010/0162525 A1 Jul. 1, 2010

(30) Foreign Application Priority Data

May 23, 2007 (DE) .......................... 10 2007 025 771
Jun. 13, 2007 (DE) .......................... 10 2007 027 153

(51) Int. Cl.
*G02C 5/22* (2006.01)
(52) U.S. Cl. ......................................... 16/228; 351/153
(58) Field of Classification Search .................... 16/228, 16/329, 331, 332, 334, 385; 351/113, 114, 351/121, 153, 111, 140
See application file for complete search history.

(56) References Cited

U.S. PATENT DOCUMENTS

| | | | | |
|---|---|---|---|---|
| 3,567,315 A | | 3/1971 | Speer | |
| 4,351,086 A | * | 9/1982 | Drlik | 16/228 |
| 4,689,851 A | * | 9/1987 | Beyer | 16/228 |
| 4,747,183 A | * | 5/1988 | Drlik | 16/228 |
| 5,400,090 A | * | 3/1995 | Chen | 351/113 |
| 5,533,233 A | | 7/1996 | Wagner et al. | |
| 6,095,646 A | * | 8/2000 | Montagner | 351/153 |
| 6,161,254 A | | 12/2000 | Montagner | |
| 6,390,620 B1 | | 5/2002 | Montalban | |
| 7,318,252 B2 | * | 1/2008 | Chang | 16/228 |
| 2003/0147045 A1 | | 8/2003 | Fukuoka | |
| 2003/0172492 A1 | * | 9/2003 | Schuchard | 16/228 |
| 2004/0020010 A1 | | 2/2004 | Wagner | |
| 2005/0217073 A1 | | 10/2005 | Wagner | |
| 2006/0017881 A1 | * | 1/2006 | Montagner | 351/56 |
| 2006/0126012 A1 | * | 6/2006 | Fiehn | 351/153 |

FOREIGN PATENT DOCUMENTS

| | | |
|---|---|---|
| DE | 44 15 308 C1 | 11/1995 |
| DE | 697 09 347 T2 | 8/2002 |
| DE | 101 28 383 A1 | 2/2003 |
| DE | 697 26 721 T2 | 9/2004 |

(Continued)

*Primary Examiner* — Chuck Y. Mah

(74) *Attorney, Agent, or Firm* — Harness, Dickey & Pierce, P.L.C.

(57) ABSTRACT

An electrically weldable spring hinge for eyeglasses includes a housing open on a bottom side having a cavity into which a spring element may be inserted and in which at least one support element is provided. The spring hinge additionally includes a hinge element displaceably supported in the housing. The at least one support element is essentially centrally located in the region of an open end face section of the housing and, starting from a base area of the housing, protrudes into the cavity in a freestanding manner. A welding button for electrically welding the housing to the eyeglass element is provided on the bottom side of the support element facing an eyeglass element.

20 Claims, 10 Drawing Sheets

FOREIGN PATENT DOCUMENTS

| | | |
|---|---|---|
| EP | 0 262 099 A2 | 3/1988 |
| EP | 0 262 099 A3 | 3/1988 |
| EP | 0 679 920 A | 11/1995 |
| EP | 0 902 908 B1 | 12/2001 |
| EP | 1 335 236 A | 8/2003 |
| EP | 0 896 692 B1 | 12/2003 |
| EP | 1 617 276 A | 1/2006 |
| IT | TV 2005A 000113 | 8/2005 |
| WO | 97/41482 A | 11/1997 |

* cited by examiner

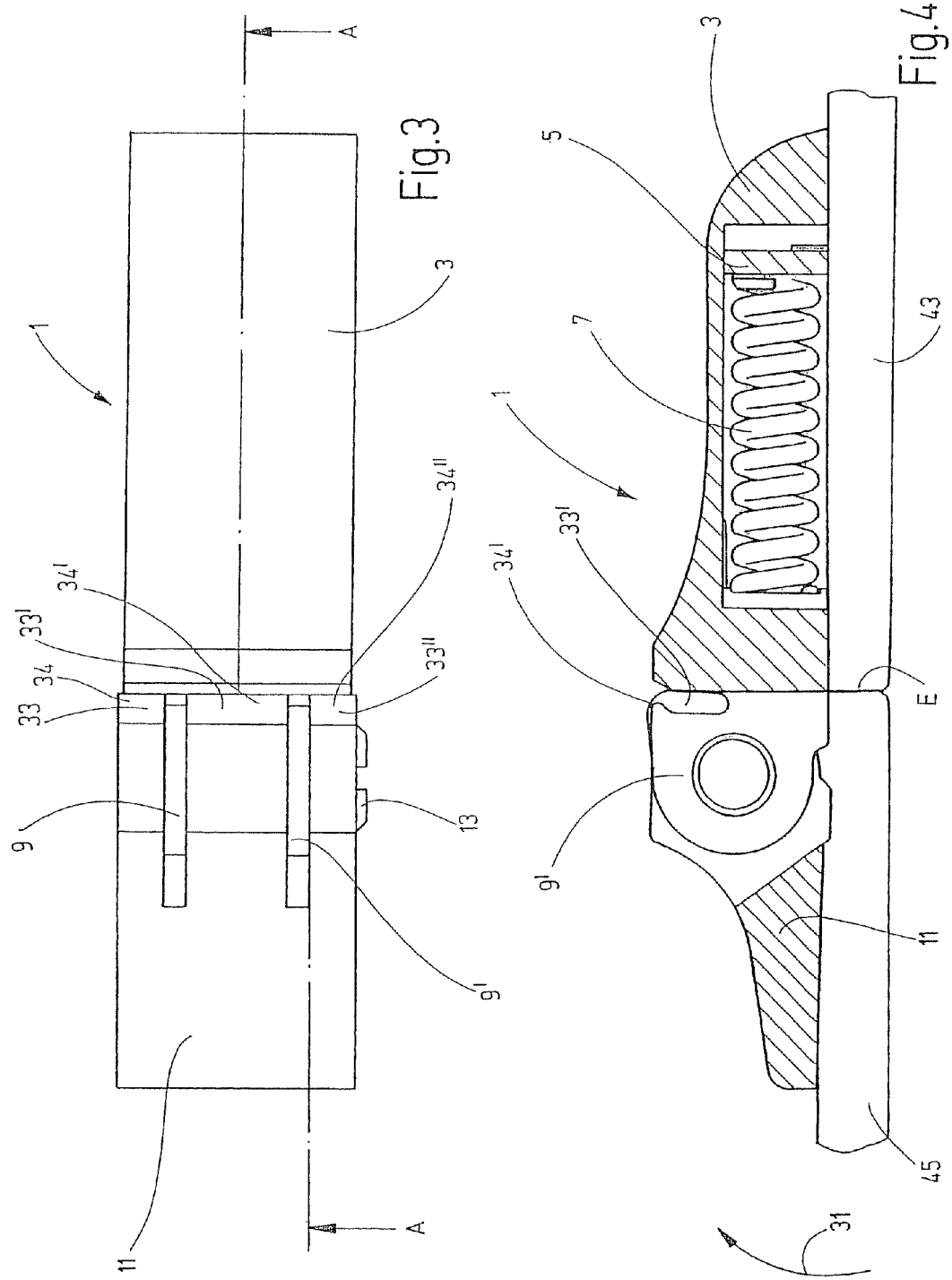

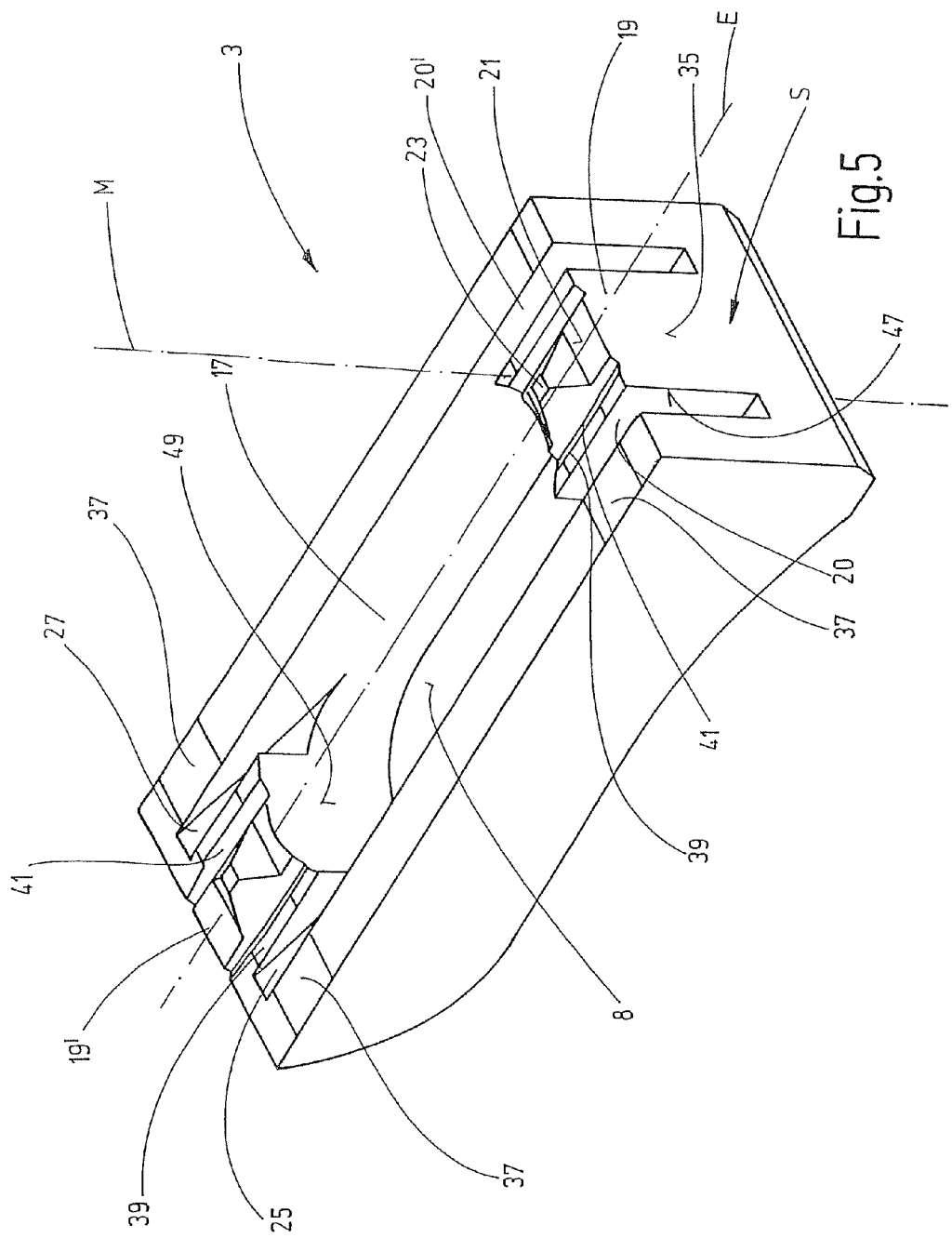

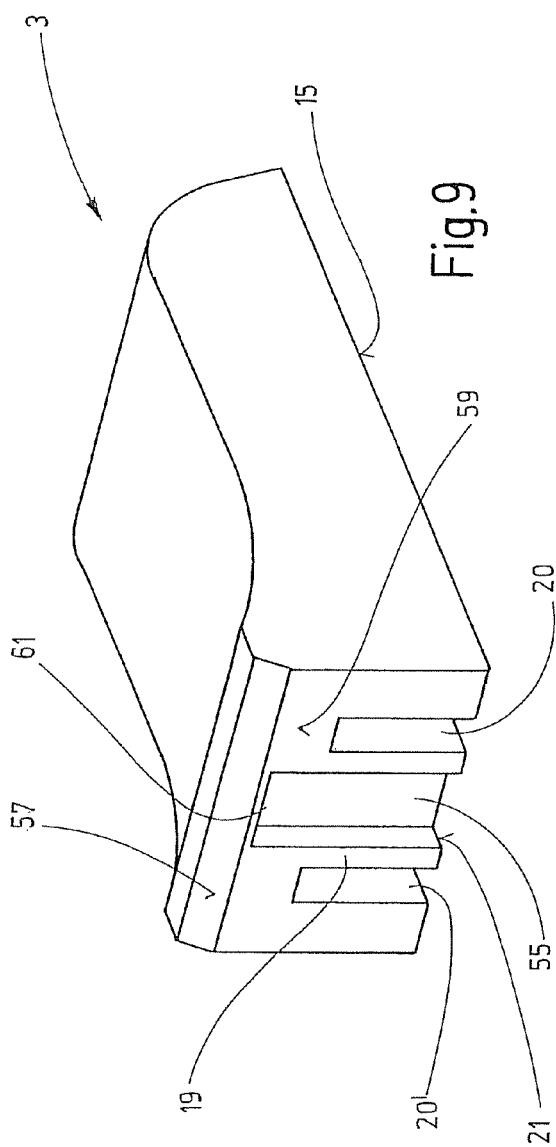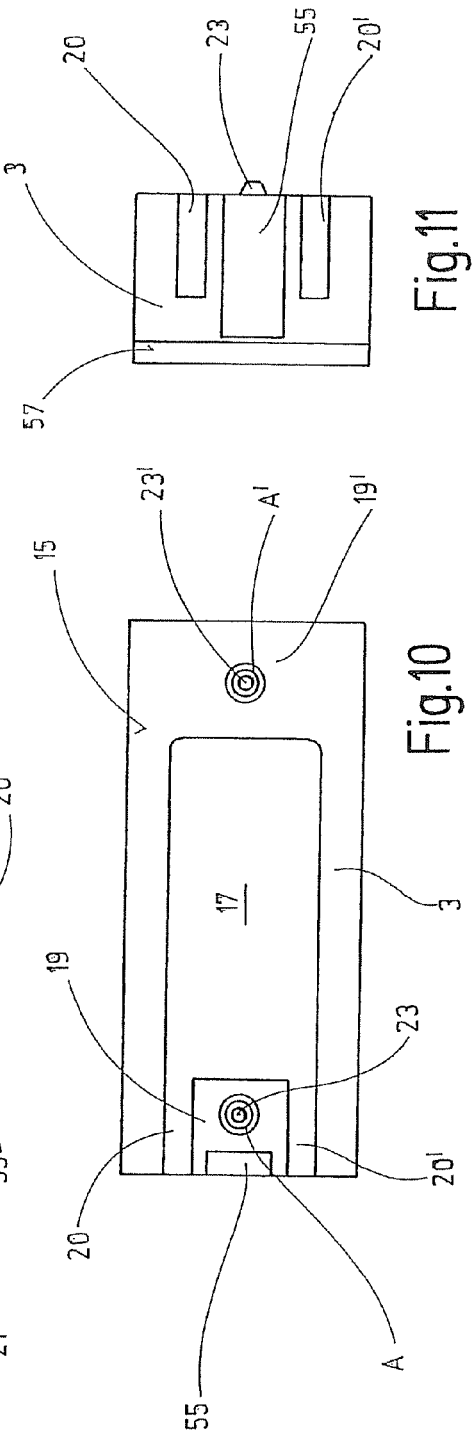

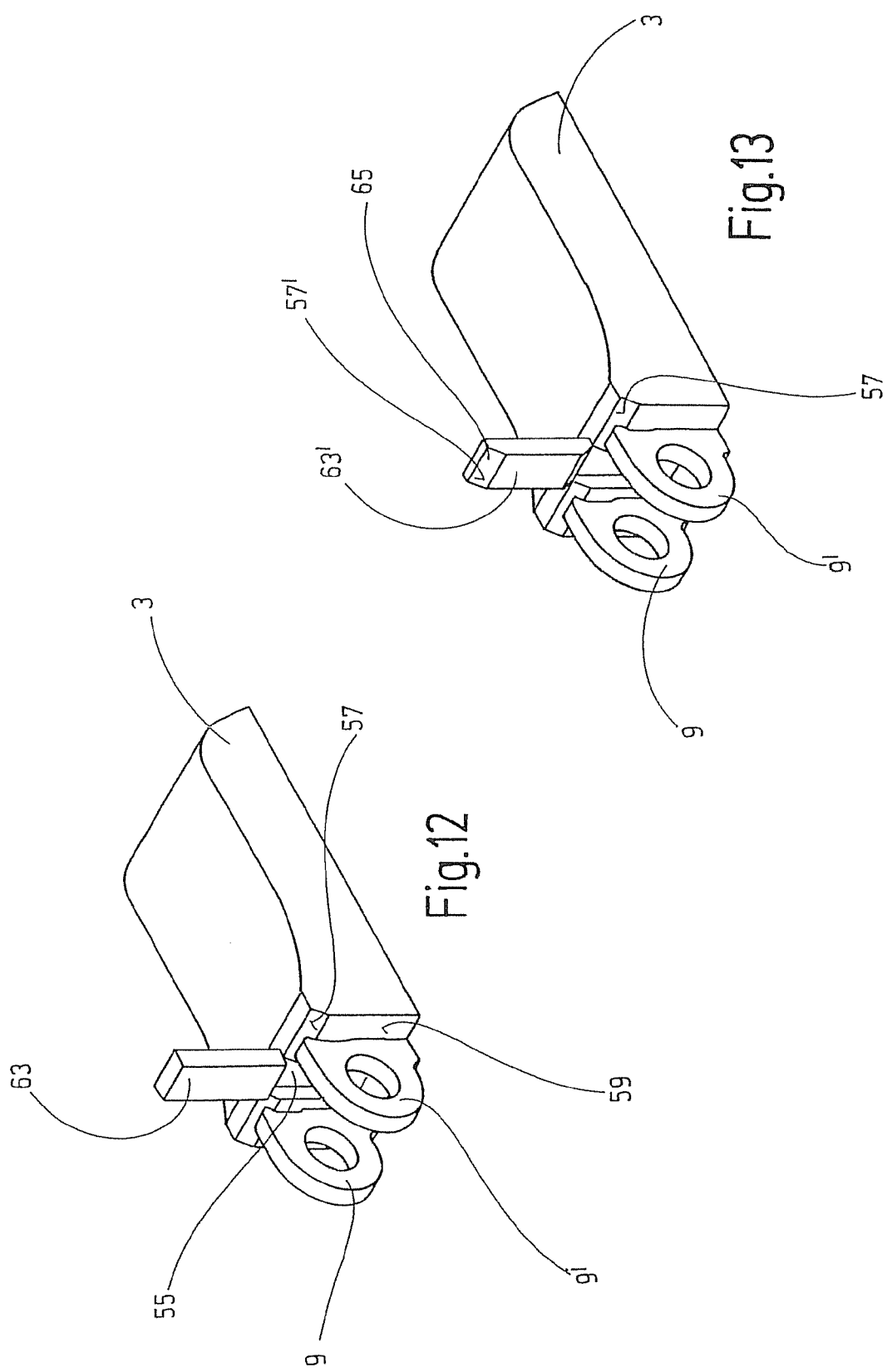

SPRING HINGE

CROSS-REFERENCE TO RELATED APPLICATIONS

This application is a 371 U.S. National Stage of International Application No. PCT/EP2008/003131, filed Apr. 18, 2008. This application claims the benefit of German Patent Application Nos. DE 0 2007 025 771.8, filed May 23, 2007 and DE 0 2007 027 153.2, filed Jun. 13, 2007, the disclosures of which applications are entirely incorporated herein by reference.

BACKGROUND OF THE INVENTION

The invention relates to an electrically weldable spring hinge according to the preamble of Claim 1.

Spring hinges of the type discussed herein are known. Such spring hinges are used as hinges for eyeglasses, and by use of an electric welding process are fastened to the earpieces or the center part of an eyeglass. Spring hinges include a housing which is open at a bottom side and has a cavity in which a spring element is situated. Also provided in the housing are at least one support element and a hinge element which is displaceably supported in the housing. For electric welding the bottom side of the spring hinge is firmly pressed against an eyeglass element, for example an earpiece. The contact pressure is in the range of 70 to 700 N, for example. As soon as the contact forces are applied, a welding current of 2000 A to 8000 A is passed through the housing of the spring hinge and the eyeglass element, i.e., the earpiece or the center part of an eyeglass. In the contact region between the spring hinge and the earpiece weld buttons are provided which heat up and melt under the high current intensities. A secure connection between the spring hinge and the eyeglass element is produced in this manner. It has been found that under the high contact forces deformation of the housing of the spring hinge may occur, in particular in the cavity provided inside the housing which is used to accommodate the spring element, the hinge element, and the support element. During electric welding, material deposits may also occur which impair optimal functioning of the spring hinge. The material inside the housing, namely in the cavity, may be displaced, resulting in a protrusion at that location. If the housing and thus the cavity undergoes deformation, the mobility of the hinge element relative to the housing, and therefore the functioning of the spring hinge, is impaired. Such deformations of the housing occur in particular in small spring hinges which are finding increasing use.

SUMMARY OF THE INVENTION

The object of the invention, therefore, is to provide a spring hinge of the aforementioned type which, despite very small dimensions, may be optimally attached to an eyeglass element in an electric welding process.

This object is achieved by use of an electrically weldable spring hinge having the features stated in Claim 1. The spring hinge is characterized in that at least one support element is essentially centrally located in the region of an open end face section of the housing and, starting from a base area of the housing, protrudes into the cavity in a freestanding manner, and at least one welding button for electrically welding the housing to the eyeglass element is provided on the bottom side of the support element facing an eyeglass element. This design of a spring hinge offers the advantage that the welding current is introduced into the housing directly in the region of the support element without passing through other regions of the housing, so that thermal decoupling occurs as a result of the freestanding configuration of the support element having the weld button. Due to the fact that the support element extends into the cavity of the housing without contacting the adjacent housing, a defined guiding of the welding current to the weld button in a targeted manner is possible, thereby effectively avoiding deformation or displacement of the material of the housing. On account of the advantageous central configuration in the region of the open end face section, in the cavity where it is insulated from the housing, the support element is also able to intercept the contact forces introduced during the welding process in a particularly effective manner. At the same time, as previously stated, the support element ensures an optimal current flow, so that little or no welding current flows through other regions of the housing, and overheating and impairment, in particular of thin housing regions and the spring element, are avoided. It is thus possible for the spring hinge, as a completely preassembled module comprising a housing, spring element, and hinge part, to be welded to an eyeglass element.

Preferred is an electrically weldable spring hinge characterized in that the support element is designed as one piece with the housing. As a result of this design the spring hinge has a particularly compact construction, and the manufacture of the spring hinge is therefore particularly simple and inexpensive.

Also preferred is an electrically weldable spring hinge characterized in that the support element at the same time is used as a closure part for the housing. As a result of this advantageous design of the support element no additional closure element for the spring hinge is necessary, so that a particularly compact and inexpensive design of the spring hinge may be realized.

In a further electrically weldable spring hinge, the bottom side of the support element ends in flush alignment with the bottom side of the housing of the spring hinge. The weld button, which is mounted on the support element and projects beyond the bottom side of the support element, therefore also projects beyond the bottom side of the housing. For electric welding the protruding weld button, as described above, is pressed onto the eyeglass element. Due to the fact that the bottom side of the support element ends essentially in flush alignment with the bottom side of the housing, this results in a particularly stable spring hinge when the weld button is melted.

A further preferred electrically weldable spring hinge includes at least one additional support element having at least one weld button. The additional support element is also preferably designed as one piece with the housing. By the use of two support elements, each having weld buttons, on the one hand the contact pressure during the electric welding is better distributed, and on the other hand a better hold of the housing on the eyeglass element is provided after the welding.

A further electrically weldable spring hinge is characterized in that the support element is used as an abutment for the spring element in the region of the open end face section. As a result of this advantageous design an additional abutment is not necessary, so that the spring hinge has a particularly short design, and due to the support element also has high stability. The function of the support element as an abutment for the spring element also assists in simple installation of the housing on an eyeglass element as a preassembled module.

In a further preferred electrically weldable spring hinge, a slot in which the hinge element may be situated is provided between the housing and the support element, on both sides of a center plane of the spring hinge. In particular for an advantageous U-shaped design of the hinge element, the slots are then used as guide slots. This in turn reduces the size of the spring hinge, since it is not necessary to provide an additional guide apparatus for the hinge element in the housing.

A further preferred electrically weldable spring hinge is characterized in that the hinge element has two webs, each of which has a hinge eye. In particular, the hinge element is connected to a three-roller hinge element via the two webs. When a three-roller hinge element is used, in particular the overall play is minimized in the hinge element situated in the housing of the spring hinge, since each web of a hinge part is surrounded by two rollers of the other hinge part. "Overall play" refers to the play of the hinge element in three dimensions, namely, on the one hand due to the bearing in the housing of the spring hinge, and on the other hand due to the attachment to the hinge part. This design results in particularly high stability of the spring hinge.

Also preferred is an electrically weldable spring hinge in which the support element has a rolloff surface for a cam of a hinge element. The cam of the hinge element can be supported on the rolloff surface of the support element when an earpiece is moved to a closed position or a worn position.

Also preferred is an electrically weldable spring hinge which is characterized in that the hinge is designed as a punched part which is bent into a U shape after the punching. The material used is preferably a material having a uniform thickness, and which also has high strength and preferably a rustproof design. This allows a particularly simple and inexpensive implementation of the hinge element situated in the housing.

Further advantageous embodiments of the invention result from the subclaims.

BRIEF DESCRIPTION OF THE DRAWINGS

The invention is explained in greater detail below with reference to the figures, which show the following:

FIG. 3 shows a top view of a spring hinge;

FIG. 4 shows a longitudinal section of the spring hinge according to FIG. 3, along section line A-A;

FIG. 5 shows a perspective illustration of the housing of a spring hinge;

FIG. 9 shows a perspective illustration of one embodiment of the spring hinge;

FIG. 10 shows a bottom view of the spring hinge according to FIG. 9;

FIG. 11 shows an end face view of the spring hinge according to FIG. 9;

FIG. 12 shows a perspective illustration of a further embodiment of the spring hinge;

FIG. 13 shows a perspective illustration of a further embodiment of the spring hinge;

DETAILED DESCRIPTION OF THE PREFERRED EMBODIMENT

Figure 1:
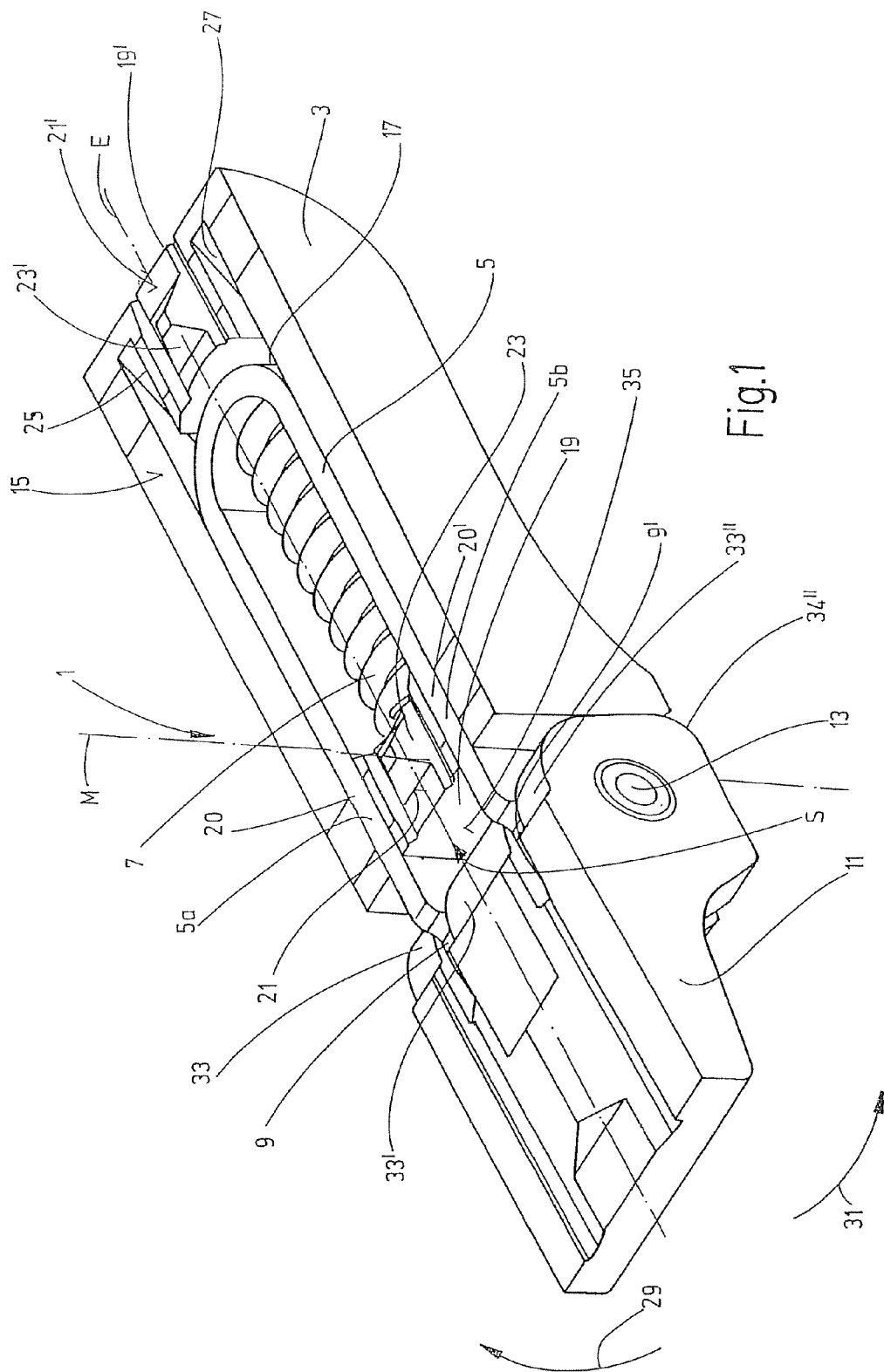
FIG. 1 shows a perspective illustration of a preassembled spring hinge.

FIG. 1 shows a perspective illustration of a preassembled spring hinge 1 for eyeglasses, having a housing 3, a hinge element 5, and a spring element 7. The spring hinge 1 is connected to an associated hinge part 11 via webs 9 and 9' of the hinge element 5. The hinge element 5 is attached to the hinge part 11 via a connecting element 13 which is only indicated here.

The hinge element 5 is preferably a punched part having a U-shaped design. The hinge element is preferably fabricated from a material of uniform thickness which also has average to high strength and is preferably rustproof. The U shape of the hinge element 5 imparts stability to the spring hinge 1, so that in particular wider earpieces are able to cooperate with the spring hinge 1. In this case the spring hinge 1 is designed in such a way that the arms of the hinge element 5 are farther apart. As a result of the U shape the hinge element 5 has an elastic design in a manner of speaking, and thus optimally matches the characteristics of the spring hinge 1. In addition, as a result of the U-shaped design the hinge element 5 may be doubled up so that wobbly play of the hinge element 5 may be balanced, in particular reduced.

FIG. 1 clearly shows that the spring hinge 1 has a bottom side 15, toward which the housing 3 of the spring hinge 1 is open. By means of this bottom side 15, in the installed state the spring hinge 1 rests on an eyeglass element, an earpiece, or a center part (not illustrated). The housing 3 also has a cavity 17 in which the hinge element 5 and the spring element 7 are situated.

Also situated in the cavity 17 is a support element 19 which is provided in the region of an open end face section S of the housing 3 and which, starting from a base area B of the housing 3 shown in FIG. 5, extends into the cavity 17 in a freestanding manner, i.e., contacts the housing 3 only in the region of the base area B. In the region of the open end face section S the support element 19 is centrally located; i.e., a center axis M of the support element 19 lies in a center plane E which extends in the longitudinal direction as viewed from the center of the spring hinge 1, or at least is situated in the immediate vicinity thereof. The bottom side 21 of the support element 19, as shown in FIG. 1, preferably ends in flush alignment with the bottom side 15 of the housing 3. A weld button 23 which is used for electric welding of the housing 3 to an eyeglass element (not illustrated here), for example an earpiece or a center part of an eyeglass, is preferably provided on the bottom side 21 of the support element 19. In addition, multiple weld buttons 23 may be situated, for example adjacently, on the support element 19.

Slots 20 and 20' in which the hinge element 5 may be guided are respectively provided between the housing 3 and the support element 19 on each side of the center plane E of the spring hinge 1. The slots 20 and 20' are preferably situated symmetrically with respect to the center plane E, and result from the freestanding configuration of the support element 19. The slots 20, 20' thus perform multiple functions, namely, on the one hand the guiding of the hinge element 5 in the housing 3, and on the other hand thermal decoupling of the support element 19 from the housing 3. The slots 20 and 20' extend on both sides of the support element 19 with respect to the center plane E, preferably from the bottom side 15 of the housing 3 to the base area of the housing 3 (not shown). The freestanding configuration of the support element 19 in the cavity 17 is achieved in this manner.

A welding current may thus be introduced into the region of the housing 3 which intersects the center axis M of the support element 19 and, without passing through other housing regions, is directly introduced into the support element 19 and into the weld button 23. In addition, the contact force during the welding process is thus concentrated exclusively on the region around the center axis M of the support element 19.

The central, freestanding configuration of the support element 19 having the weld button 23 thus results in an optimal distribution of force during welding of the spring hinge 1 to an eyeglass element (not illustrated), and also offers the advantage that thermal decoupling occurs during the welding, since the welding current is able to flow exclusively in the support element 19 due to the spatial separation of the support element 19, having the weld button 23, from the housing 3.

As a result of slots 20 and 20', the support element 19 having the weld button 23 is decoupled from the remainder of the housing 3 in such a way that the heat from the current flow during welding is generated in a defined manner in the region of the support element 19.

As described above, the slots 20 and 20' thus advantageously not only perform a guide function for the hinge element 5, but at the same time also provide thermal decoupling so that a defined current flow occurs exclusively in the support element 19 and the weld button 23 during welding of the spring hinge 1 to an eyeglass element.

In the region of the housing 3 opposite the open end face section S a further support element 19' is provided which likewise preferably has a weld button 23' on its bottom side 21'. It is also possible for multiple weld buttons 23' to be situated, for example adjacently, on the support element 19'. Recesses 25 and 27 are visible next to the support element 19' which, corresponding to slots 20 and 20', thermally separate the support element 19' from the adjacent regions of the housing 3 to ensure a defined current flow in the support element 19'. However, in contrast to slots 20 and 20', the recesses 25 and 27 are not necessarily introduced into the housing 3, but, rather, result from the production of the housing 3, which for example is milled and may be produced in the injection molding or the metal injection molding (MIM) process.

Thus, in this case the spring hinge 1 has only two weld buttons 23 and 23' which are respectively associated with a support element 19 and 19' and are offset relative to one another in the longitudinal direction of the spring hinge 1. The weld buttons 23, 23' and the support elements 19, 19' as illustrated here are preferably situated in the region of the center plane E which intersects the spring hinge 1 in the center along its longitudinal axis. The small number of weld buttons allows a particularly gentle attachment of the spring hinge 1 to an eyeglass element, since current may be guided in a more targeted manner due to the fact that the weld button 23 in particular is no longer directly adjacent to wall regions of the housing 3.

Due to the central location of the support elements 19 and 19' having the weld buttons 23 and 23', force may be optimally introduced into the spring hinge 1 during electric welding, so that only the region of the support elements 19, 19' is acted on by force and the remainder of the housing 3 experiences little or no force impingement.

The central location of the support element 19 and the weld button 23 also offers the advantage that deformation of the guide region for the hinge element 5, i.e., a change in the width of slots 20 and 20', for example, is practically eliminated, since no force which could result in deformation is exerted on the edge region of the housing 3. In contrast, for conventional spring hinges in which weld buttons are situated in the outer region of the housing 3, constriction of the guide region may result, possibly causing the hinge element 5 to jam in the housing 3 and thus impairing the functionality of the spring hinge 1. In the spring hinge 1 provided herein, jamming of the hinge element 5 is completely prevented on account of the advantageous positioning of the weld button 23.

The hinge element 5 is preferably designed as a punched part, and is thus punched from a flat part and then bent into a U shape, as shown in FIG. 1. The hinge element 5 is also moved along guide surfaces of the support element 19, not visible here, which are described in further detail below.

In the position of the spring hinge 1 illustrated in FIG. 1 the hinge element 5 is pushed to its maximum depth into the cavity 17 in the housing 3. The spring element 7, which in this case is designed as a coil spring, on the one hand is supported on the support element 19, and on the other hand is internally supported on the hinge element 5, and as a result of its elastic force pushes the hinge element 5 into the housing 3.

When the hinge part 11, which for example is attached to an earpiece of an eyeglass not illustrated here, is swiveled clockwise in the direction of the arrow 29 about the center axis of the connecting element 13, the hinge element 5 is displaced from the housing 3 along the guide surfaces of the support element 19 (not visible here), against the force of the spring element 7. The spring hinge 1 thus allows an earpiece to be swiveled out of the normal worn position, so that, for example, putting on the eyeglasses is simplified for the wearer, and the earpieces are pressed against the wearer's head.

When the hinge part 11 is moved in a direction denoted by the arrow 31, the earpiece of an eyeglass is moved to a closed position, for example when the eyeglasses are to be stored in a case. In this instance tabs 33, 33', and 33" of the hinge part 11 are supported on the housing 3. In the present case the hinge part 11 is designed as a three-roller hinge element which thus has three tabs 33, 33', 33". Each of the tabs has a cam, also referred to as a lug. In this case the cam 34" of tab 33" is visible in FIG. 1. However, it is also possible to use a one-roller hinge element with a tab. However, a three-roller hinge part 11 is preferably used in order to minimize axial play of the hinge element 5. As a result of each arm 5a, 5b of the U-shaped hinge part 5 being guided between the interior of the cavity 17 and the lateral surfaces of the support element 19 which are used as a guide surface, the hinge part 11 is stabilized and the overall play of the spring hinge 1 is minimized. "Overall play" refers to the play of the hinge element in three dimensions, namely, on the one hand due to the bearing in the housing of the spring hinge, and on the other hand due to the attachment to the hinge part.

It is also seen from FIG. 1 that the support element 19 is not only used for the targeted introduction of a welding current into the weld button 23 for thermally decoupling the support element 19 from the remainder of the housing 3 via slots 20 and 20' and for intercepting the contact forces during the electric welding, but also has a rolloff surface 35 on which the cam for the tab 33' of the hinge part 11 is able to roll, for example when the hinge part 11 is displaced along the arrow 31 into its closed position. The cam for tab 33 and the cam 34" for tab 33", not visible here, roll on the end face of the housing 3.

As previously mentioned, the support element 19 also has the advantage that it is not necessary to provide an additional abutment for the spring element 7, since the spring element 7 can be supported on the support element 19.

The design of a spring hinge illustrated in FIG. 1 allows particularly inexpensive manufacture of a spring hinge 1 which may be electrically welded as a preassembled module composed of three elements on an eyeglass element. It is also clearly shown that by combining a housing 3, a spring element 7, and a hinge element 5 the spring hinge 1 provided herein may be implemented without additional elements.

The guide for the hinge element 5, the abutment for the spring element 7, the rolloff surface 35 for tab 33', and the closure element for the spring hinge 1 are implemented by means of the support element 19. This allows significant savings in space, thus allowing a particularly compact and stable spring hinge 1 to be economically implemented.

At the same time, the support element 19 guides the welding current to the weld button 23 in a targeted manner, so that other elements such as the spring element 7, for example, do not incur damage during the electric welding as a result of the high welding current. The at least one support element 19 also prevents deformation of the housing 3 or other elements of the spring hinge 1 during the electric welding, which is associated with considerable contact pressure on the spring hinge 1.

Figure 2:
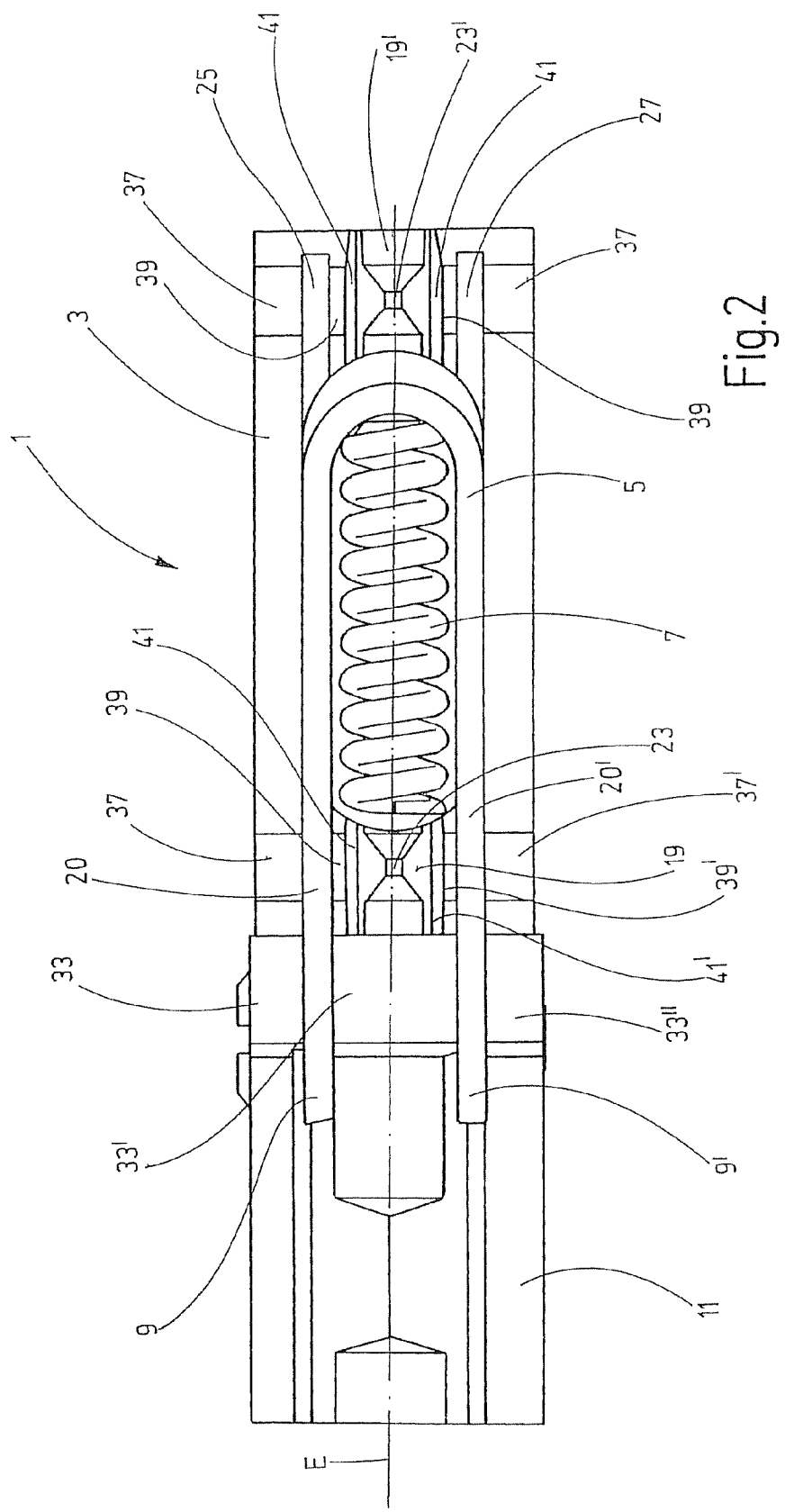
FIG. 2 shows a bottom view of a preassembled spring hinge.

FIG. 2 shows a bottom view of a preassembled spring hinge, i.e., a spring hinge 1 in which the hinge element 5 and the spring element 7 are inserted in the housing 3, so that in this preassembled state the spring hinge 1 may be placed on an eyeglass element such as a center part of an eyeglass or an earpiece, for example, and electrically welded under contact pressure.

Once again, it is clear that the weld buttons 23, 23' are located centrally, i.e., in the region of the center plane E, which in the present case extends perpendicular to the plane of the drawing.

FIG. 2 also clearly shows webs 9 and 9' of the hinge element 5 which extend beyond the end face of the housing 3 of the spring hinge 1 and are situated in the clearances between tabs 33, 33', and 33" of a hinge part 11. Each web 9, 9' of the hinge element 5 is thus surrounded by the hinge part 11, which results in a particularly stable bearing of the hinge element 5 in the spring hinge 1. This also reduces the overall play.

The spring element 7, generally under pretension, on the one hand is supported on the support element 19 and on the other hand is internally supported on the hinge element 5. The support element 19 is thus used as an abutment for the spring element 7, and with its elastic force presses the hinge element 5 into the housing 3.

Also seen in FIG. 2 are depressions 37 and 37' in the housing 3 and depressions 39 and 39' in the support elements 19 and 19', respectively. In addition, grooves 41 and 41' are provided in the support elements 19 and 19', respectively. These depressions 37, 37', 39, 39' and grooves 41, 41', also referred to as compensating grooves, are used to accommodate the material of the weld buttons 23 and 23' which are melted by the welding current, thus allowing the spring hinge 1 to lie directly against an eyeglass element after the electric welding without the melted material producing a space or unevenness between the spring hinge 1 and the eyeglass element. The grooves 41 and 41' situated next to the weld button 23 are primarily used to prevent welding material flow into slots 20 and 20', thus ensuring satisfactory guiding of the hinge element 5 in this region after the welding.

FIG. 3 shows a top view of the spring hinge 1. Identical parts are provided with the same reference characters, and therefore reference is made to the description for the preceding figures.

Once again the housing 3 for the spring hinge 1 is shown, which is connected to the hinge part 11 via the webs 9, 9' of the hinge element 5 situated in the housing 3. Contact pressure is exerted on the spring hinge 1 during the electric welding. According to the present invention the welding current is introduced into the housing in particular at the locations at which the support elements 19, 19' are present. Also shown are tabs 33, 33', and 33" and their associated cams 34, 34', and 34".

FIG. 4 shows a longitudinal section of the spring hinge 1 along section line A-A according to FIG. 3.

In FIG. 4 the spring hinge 1 is illustrated in the open state, and the earpiece is therefore, in other words, in the worn position. The housing 3 for the spring hinge 1, strictly as an example, may be attached to an earpiece 43, and the hinge part 11 may be attached to a center part 45 of an eyeglass. It is also possible to attach the housing 3 to a center part 45 of an eyeglass.

FIG. 4 also clearly shows that when the hinge part 11 is moved in the direction of the arrow 31, the cam 34' of tab 33' is supported on the support element 19 until the hinge part 11 has reached its first opened position, illustrated in FIG. 4, in which the end E of the earpiece contacts the center part of the eyeglass.

FIG. 5 shows a perspective illustration of the housing 3 for the spring hinge 1. Identical parts are provided with the same reference characters, and therefore reference is made to the description for the preceding figures.

In the housing 3 for the spring hinge 1 illustrated in FIG. 5, the support elements 19 and 19' are advantageously designed as one piece with the housing 3. This simplifies the manufacturing process for the housing 3 and also provides for simple installation of the spring hinge 1. The one-piece design of the support element 19 together with the housing 3 also contributes to improved stability of the spring hinge 1.

It is clearly shown in FIG. 5 that the support element 19 is centrally located in the region of the open end face section S and, starting from the base area B, extends into the cavity 17 in a freestanding manner.

The support element 19 has guide surfaces 47 on both sides. In the preassembled and welded states of the spring hinge 1 the hinge element 5 is slidably supported on the guide surfaces 47 of the support element 19. The hinge element 5 may thus extend along the guide surfaces 47, for example when the earpiece is displaced beyond its normal worn position. The end-face inlet of the spring hinge 1 remains closed due to the support element 19. The support element 19 thus also performs the function of a closure element which prevents contaminants from penetrating into the housing 3 for the spring hinge 1 and thus impairing the functionality of the spring hinge 1.

FIG. 5 also shows that the inner contour 49 of the housing 3 in the region of the support element 19' is rounded in such a way that displacement of the U-shaped hinge element 5 in the housing 3 is possible. The depth of penetration of the hinge part 5 into the housing 3 is limited by the webs 9 and 9', which as a result of the elastic force of the spring element 7 outwardly contact the housing 3.

Figure 6:
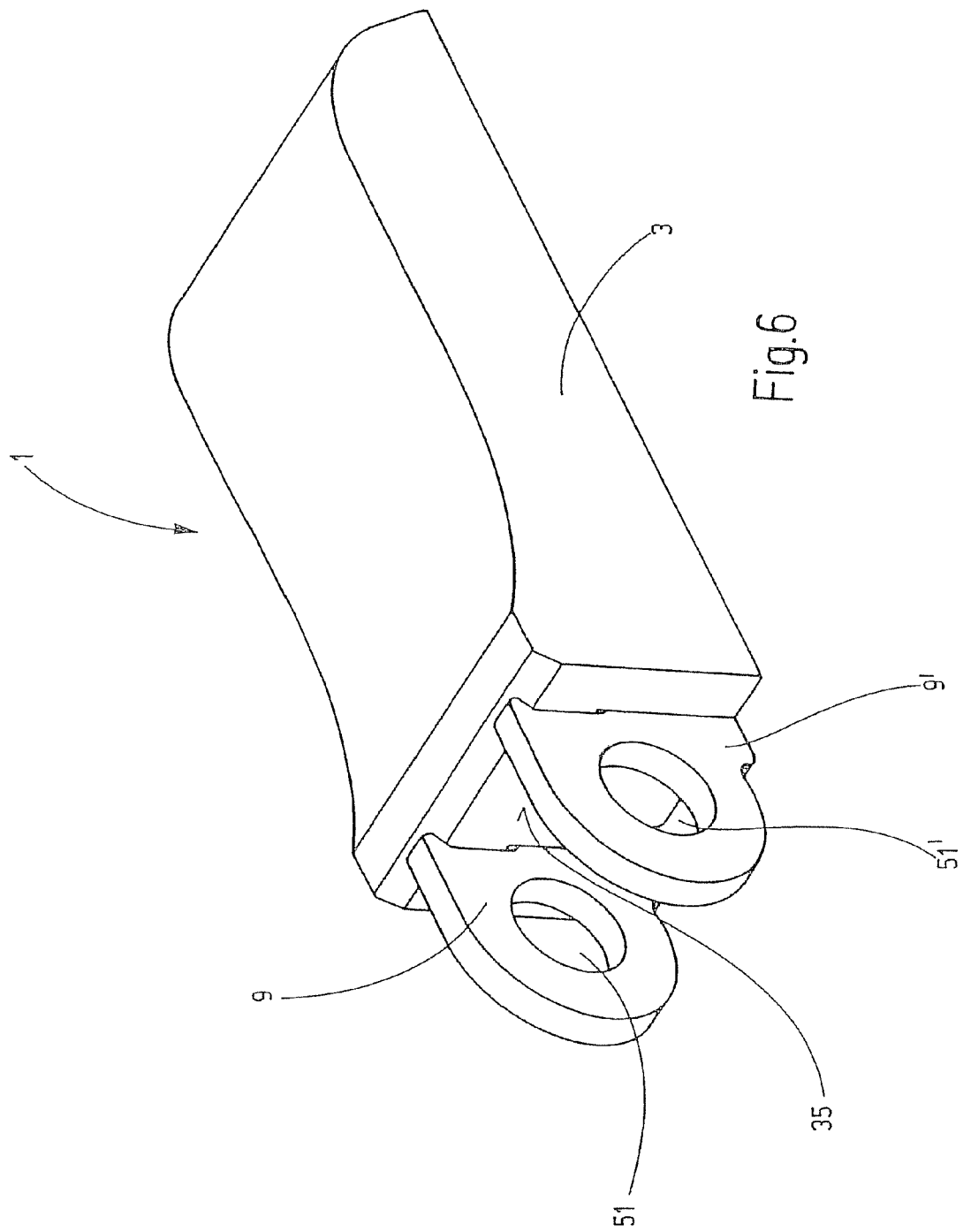
FIG. 6 shows a perspective top view of a spring hinge.

FIG. 6 shows a perspective top view of the spring hinge 1; in this case the hinge element 5 is not engaged with the hinge part 11. Identical parts are provided with the same reference characters, and therefore reference is made to the description for the preceding figures.

The webs 9 and 9' have hinge eyes 51 and 51', respectively, through which the connecting element 13, as shown in FIG. 1, may be passed for connecting the two hinge elements 5 and 11.

Figure 7:
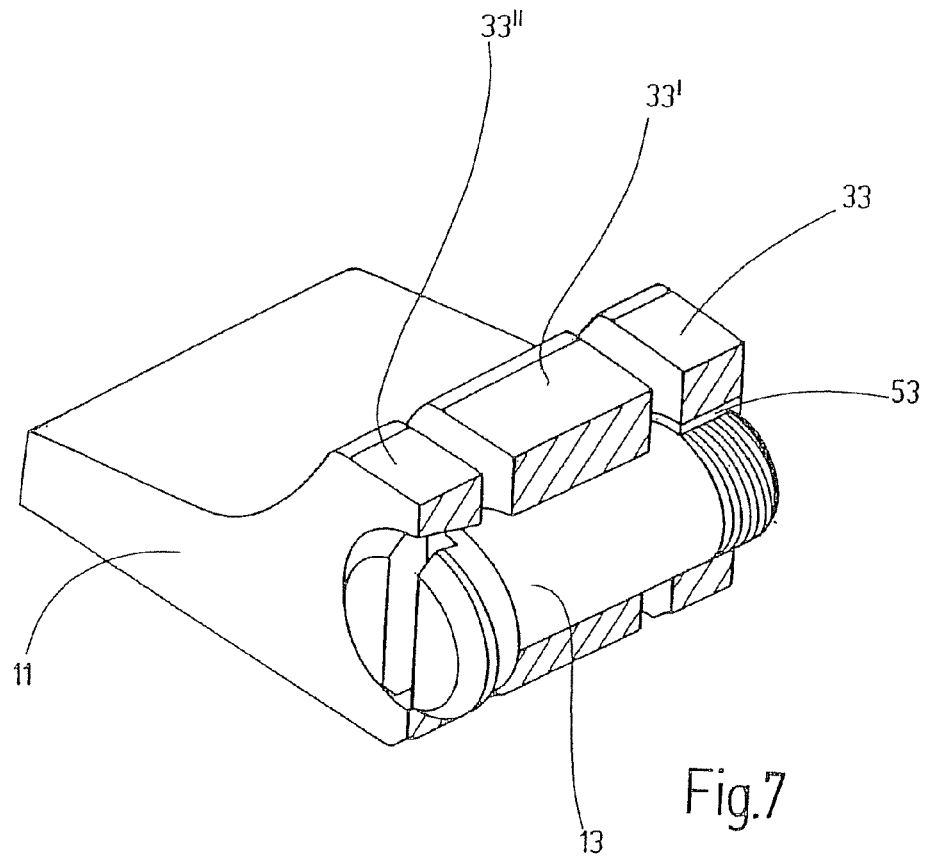
FIG. 7 shows a perspective illustration of a partially cut-away hinge part.

FIG. 7 shows the hinge part 11 having a three-roller design, together with its three tabs 33, 33', and 33". The ends thereof and also the cams are cut off in this view. It is clearly seen that the connecting element 13 is guided through a recess in the hinge part 11, i.e., in the tabs, in order to connect the hinge part 11 to the hinge element 5.

Providing the hinge part 11 with three tabs, between each of which a web 9, 9' (not illustrated here) of the hinge element 5 may be situated, ensures a particularly stable design of the spring hinge 1. Overall play of the hinge part 11 with respect to the housing 3 is greatly reduced by virtue of this design.

Figure 8:
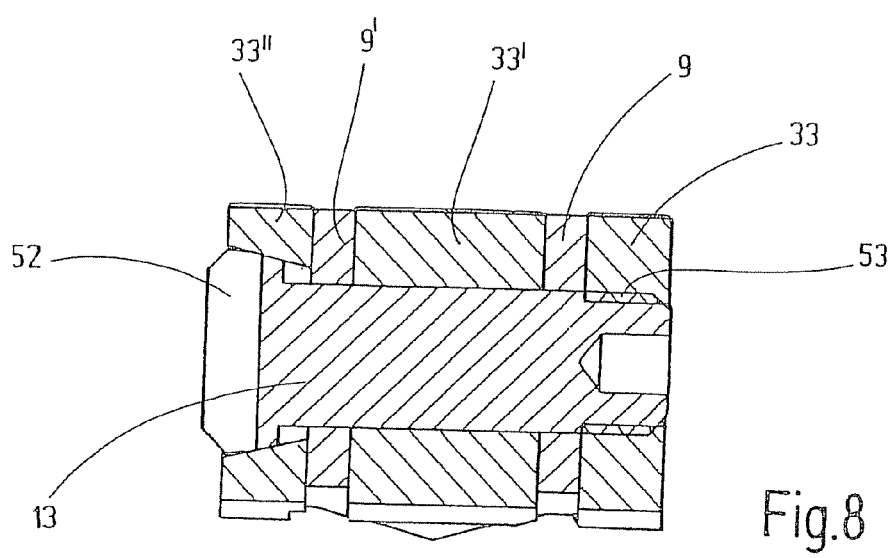
FIG. 8 shows a sectional illustration of the hinge element according to FIG. 7.

FIG. 8 shows a cross section of a hinge element 5 which is connected to a hinge part 11. It is seen in FIG. 8 that the connecting element 13 is designed as a screw having a head 52 and an outer thread 53 which engages in the tab 33.

FIG. 9 shows a perspective top view of a housing 3 according to a further embodiment of a spring hinge 1. Identical parts are provided with the same reference characters, and therefore reference is made to the description for the preceding figures.

In the region of the rolloff surface 35 of the support element 19 illustrated in FIGS. 1 through 6, in the embodiment illustrated here a recess 55 is provided in the support element 19 which is used to accommodate a rolloff element, not illustrated here, which replaces the rolloff surface 35. The recess extends from the bottom side 21 of the support element 19 to a bevel 57. For simplification, the hinge element 5 and the hinge part 11 are not illustrated.

The recess 55 may be milled into the housing 3 or into the support element 19. However, the housing 3 and the support element 19 as well as the recess 55 may also be produced by a metal injection molding (MIM) process.

FIG. 10 shows once again the bottom side of the housing 3, and FIG. 11 shows a side view of the housing 3. The recess 55 which is introduced into the end face 59 of the housing 3, in particular into the support element 19, is clearly seen. For simplification, the design of the support element 19' and of the recesses 25 and 27 are not shown in further detail.

According to FIG. 10, the recess 55 as viewed in the cross section preferably has a trapezoidal or dovetail shape, thus preventing a rolloff element inserted into the recess 55 from falling out. A rolloff element, which preferably has the same cross-sectional shape as the recess 55, may thus be inserted from the bottom side 15 of the housing 3 until it is completely in the recess 55. In this manner the rolloff element is inserted, in particular pressed, with a fixed shape into the recess 55.

The housing 3 shown in FIG. 10 is preferably produced by a metal injection molding (MIM) process. Therefore, recesses 25 and 27, which may be specified by a machining production process, also are not provided in the region of the second support element 19'. Production of the housing 3 using MIM is particularly advantageous due to the large variety of shapes that may be produced. In addition, by use of MIM it is easier to produce complex shapes than with conventional, in particular machining, processes.

Grooves, i.e., compensating grooves (not illustrated), may also be provided around the weld buttons 23 and 23' for accommodating melted material, as shown in FIGS. 1 and 2, for example. In FIG. 10, however, the melted material is accommodated by compensating grooves A and A', which preferably have a circular design and are concentric with the weld buttons 23 and 23'. It is also possible to provide multiple compensating grooves A and A' concentric with the weld buttons 23 and 23', in particular to prevent welding material from flowing into the slots 20, 20' and impairing the mobility of the hinge part 5 (not illustrated here).

Due to the fact that the recess 55 extends only to the lower edge of the 57, the housing 3 in this region forms a stop 61 for the rolloff element which is thus securely connected to the housing 3 after the spring hinge 3 is installed on an eyeglass element.

FIG. 12 shows a perspective illustration of a further embodiment of a spring hinge 1. Identical parts are provided with the same reference characters, and therefore reference is made to the description for the preceding figures.

In FIG. 12 a rolloff element 63 is seen which has not yet been inserted into the recess 55. In contrast to the embodiment shown in FIGS. 9 through 11, in the present case the recess 55 extends into the bevel 57, not just up to it. This allows the rolloff element 63 to be introduced into the housing 3 from the top side, which is situated opposite from the bottom side 15.

FIG. 13 shows a perspective illustration of a further embodiment of a spring hinge 1 in which a rolloff element 63' is provided whose upper region 65 has a bevel 57' which corresponds to the shape of bevel 57, and which in particular acts as a stop surface for webs 9 and 9', as seen in FIGS. 12 and 13. This allows the rolloff element 63' to fully conform to the shape of the housing 3.

It is preferably provided that the rolloff element 63, 63' is pressed into the recess 55. This results in a particularly secure seating of the rolloff elements 63, 63' in the recess 55. The clamping force of the rolloff element 63, 63' is critical to prevent the rolloff element 63, 63' from falling out during transport of the spring hinge 1 or during chemical treatment of the spring hinge 1, or even as a result of the friction force against the rolloff element 63, 63' when the tab 33' rolls off.

The rolloff element 63, 63' is preferably composed of a material having good rolling characteristics, for example nickel silver or bronze, whereas the housing 3 or the support element 19 may preferably be composed of titanium or stainless steel.

As a whole, it is shown that as a result of the rolloff element a rolloff surface is provided which preferably has good rolling characteristics, whereas the remainder of the spring hinge 1, in particular the housing 3 and the support element 19, may be made of a material for which in particular high corrosion resistance is important, not the rolling characteristics. The material should also preferably be biocompatible, in particular compatible with the skin, and also should be lightweight. Titanium in particular is suitable for such a high-quality material.

The spring hinge 1 may thus be advantageously produced using an MIM process, by means of which a great variety of shapes may be easily realized. In this case the variant of the recess 55 shown in FIGS. 9 through 11, in which a stop 61 is provided in the upper region 65, is preferred.

Figure 14:
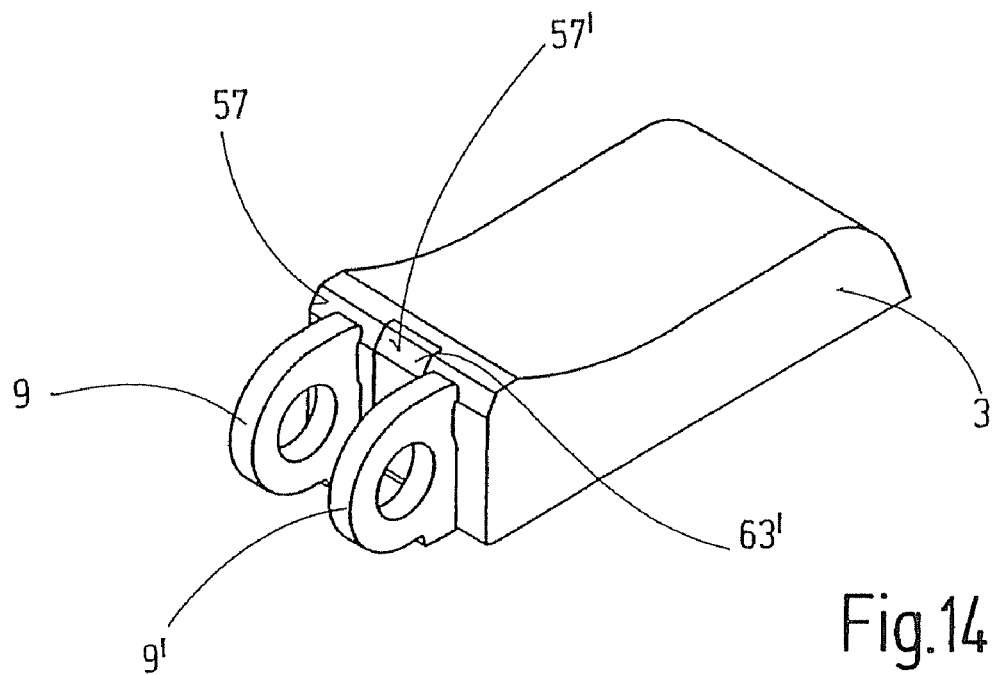
FIG. 14 shows a perspective illustration of the spring hinge according to FIG. 12.
Figure 15:
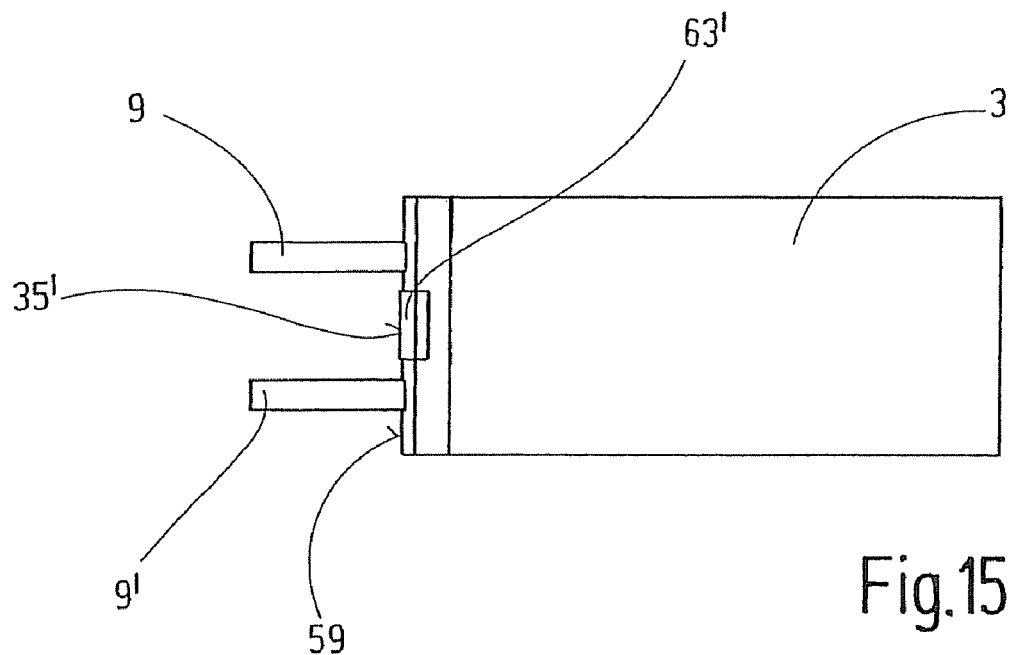
FIG. 15 shows a top view of the spring hinge according to FIG. 14.

FIG. 14 shows a perspective illustration of the spring hinge 1, and FIG. 15 shows a top view of the spring hinge 1 according to FIG. 14. Identical parts are provided with the same reference characters, and therefore reference is made to the description for the preceding figures.

In FIG. 14 the rolloff element 63' shown in FIG. 13, having the bevel 57', is located completely in the recess 55, and is preferably pressed into same so that the bevel 57' preferably ends in planar alignment with the bevel 57 of the housing 3. However, the rolloff element 63, 63' may also be connected to the housing 3 in some other way, for example by soldering, welding, or adhesive bonding.

In FIG. 15 it is clearly seen that the rolloff surface 35' of the rolloff element 63' does not end in planar alignment with the end face 59 of the housing 3, but instead projects slightly beyond same. In this manner the tab 33' of the hinge part 11 rolls off exclusively on rolloff surface 35', and therefore the end face 59 of the housing 3 is not contacted. This avoids scratch marks or lacquer erosion caused by opening and closing of the spring hinge 1 in the region of the end face 59. Wear, in particular wearing off of color or the like, therefore occurs only in a region that is not externally visible, namely, the rolloff surface 35'. In addition, the rolloff characteristics of the spring hinge 1 are not impaired by rolling of tabs 33 and 33' in the region of the end face 59.

Figure 16:
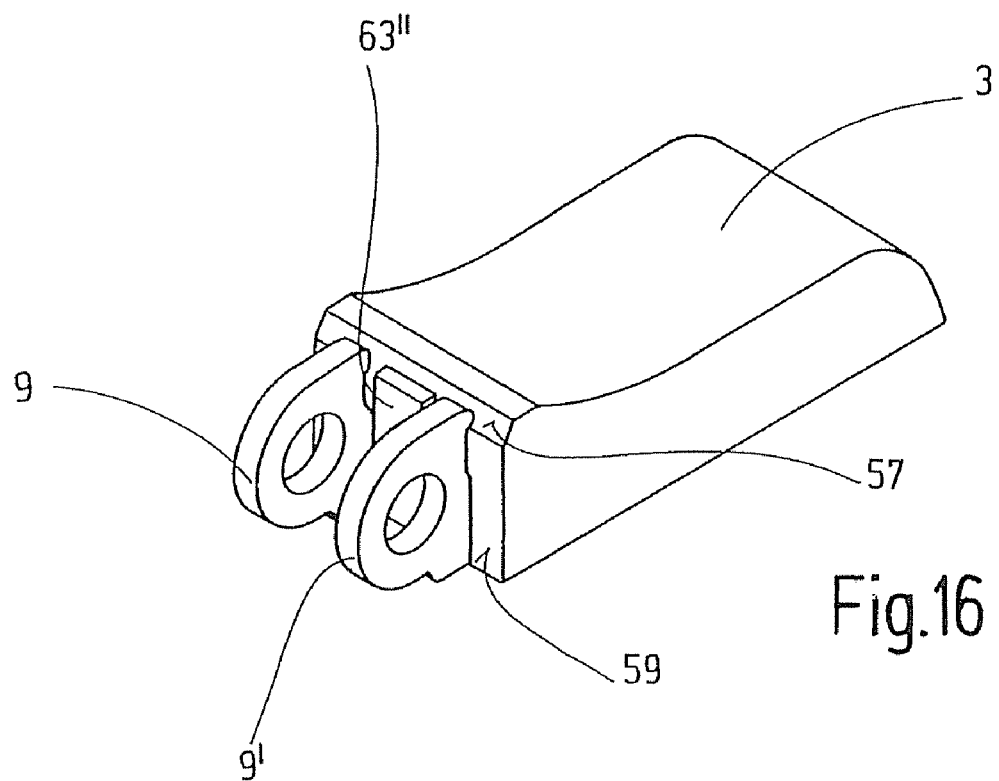
FIG. 16 shows a perspective illustration of a further embodiment of the spring hinge.
Figure 17:
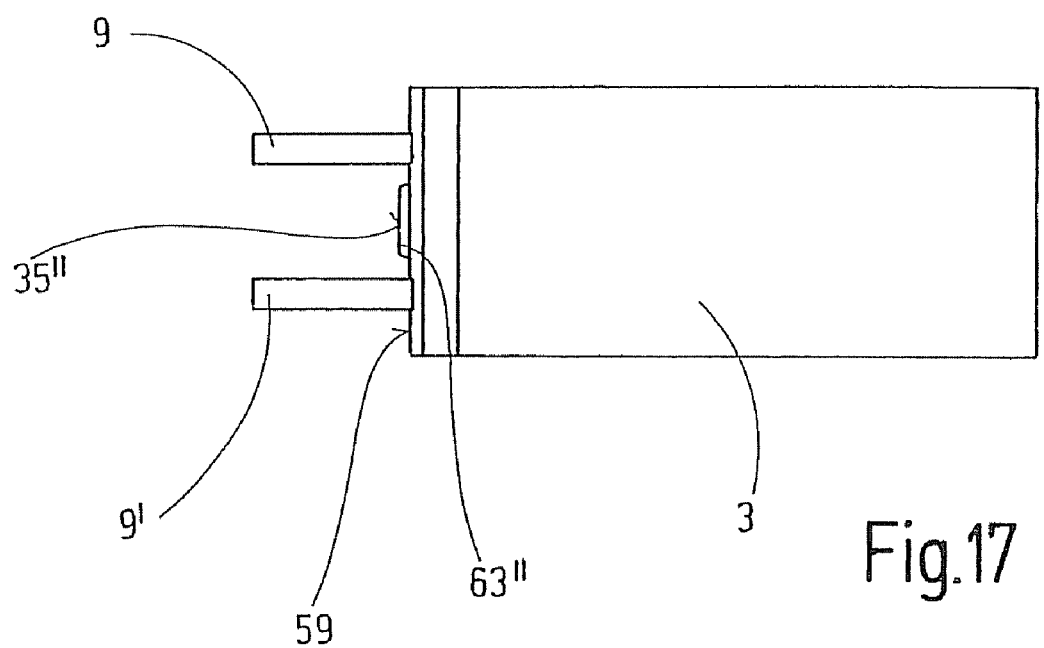
FIG. 17 shows a top view of the spring hinge according to FIG. 16.

FIG. 16 shows a perspective view of a further embodiment of the spring hinge 1, and FIG. 17 shows a top view of the spring hinge 1 according to FIG. 16. Identical parts are provided with the same reference characters, and therefore reference is made to the description for the preceding figures.

FIG. 16 shows an embodiment of the spring hinge 1 in which no recess 55 has been provided in the support element 19. Instead, a preferably cuboidally shaped rolloff element 63" is provided which is mounted on the end face 59 in the region of the support element 19. It may be provided in particular that the rolloff element 63" is attached to the support element 19 by adhesive bonding, fastening, lasering, welding, or by some other method.

It is clearly shown in FIG. 17 that in this embodiment as well the rolloff surface 35" of the rolloff element 63" projects beyond the end face 59, so that only rolling of the tab 33' (not illustrated here) on the rolloff surface 35" occurs during an opening or closing motion of the spring hinge 1.

In the above-described embodiments of a rolloff element 63, 63', and 63", an attachment, in particular an additional attachment to the support element 19, may be achieved by the fact that liquid material of the weld button flows into the region between the support element 19 and the rolloff element 63, 63', 63" during electric welding of the spring hinge 1 for connection to an eyeglass element. For this purpose, the grooves 41 and 41' preferably provided in the region of the weld button 23 may expediently be correspondingly provided in the bottom side 21 of the support element 19, so that the melted material is guided into the region of the rolloff element 63, 63', 63".

The electrically weldable spring hinge 1 for eyeglasses provided herein is thus characterized in that thermal decoupling from the remainder of the housing 3 is achieved by virtue of the central, freestanding location of the support element 19 in the cavity 17, and that contact pressure acting on the spring hinge 1 during the electric welding is effectively intercepted by the support element 19, and deformation [and] displacement of the material of the housing 3 are thus practically eliminated.

On the other hand, as the result of the weld button 23 provided on the bottom side 21 of the support element 19 it is possible to introduce the welding current directly into the preassembled spring hinge 1 in the region of the support elements 19, 19', thus allowing targeting guiding of the welding current without subjecting the other elements of the spring hinge 1 to stress and excessive heat.

It is also possible to provide at least two support elements 19', each of which may have a weld button 23', adjacent to one another, for example.

The support element 19, 19' may also be designed as one piece with the housing 3. This design makes the use of a separate closure element unnecessary. The support element 19 is also used as an abutment for the spring element 7, and as a rolloff surface 35 for the cam 34' of a hinge part 11 that is connected to the hinge element 5. The lateral guide surfaces 47 of the support element 19 may be used to guide the hinge element 5 relative to the housing 3 when an eyeglass element is moved beyond its worn position.

Due to the fact that the spring hinge 1 comprises only three components, namely, the housing 3, the hinge element 5, and the spring element 7, the spring hinge 1 may be installed on an eyeglass element in a particularly simple manner before the electric welding. The spring hinge 1 in the form of a compact preassembled module may thus be welded directly onto an eyeglass element. A spring hinge 1 provided herein may therefore be implemented in a particularly inexpensive manner, and is also especially suited for wide earpieces.

The U-shaped design of the hinge part 5 accommodated in the housing 3 and the webs 9, 9' provided thereon allow a particularly stable attachment, in particular on a three-roller hinge part 11, thereby minimizing the overall play of the spring hinge 1.

The invention claimed is:

1. A spring hinge for eyeglasses comprising:
a housing defining a cavity and having an open bottom side;
a spring element disposed in the cavity;
at least one support element essentially centrally located in a region of an open end face section of the housing and, starting from a base area of the housing, protruding into the cavity in a freestanding manner;
a hinge element displaceably supported in the housing; and
at least one welding button for electrically welding the housing to the eyeglass element provided on a bottom side of the support element for facing an eyeglass element.

2. The spring hinge according to claim 1, wherein the support element is formed as one piece with the housing.

3. The spring hinge according to claim 1, wherein the support element defines a closure part for said open end face section of the housing.

4. The spring hinge according to claim 1, wherein the bottom side of the support element ends essentially in flush alignment with the bottom side of the housing.

5. The spring hinge according to claim 1, wherein the at least one support element includes first and second support elements, said second support element located in a region of the housing opposite the open end face section, both of the first and second support elements carrying at least one weld button.

6. The spring hinge according to claim 5, wherein the first and second support elements are both designed as one piece with the housing.

7. The spring hinge according to claim 1, wherein the support element defines an abutment for the spring element.

8. The spring hinge according to claim 1, further comprising a slot in which the hinge element is situated, the slot provided between the housing and the support element, on both sides of a center plane of the spring hinge.

9. The spring hinge according to claim 1, wherein the at least one support element has guide surfaces for guiding the hinge element in the housing.

10. The spring hinge according to claim 1, wherein the hinge element has a pair of webs, each web having a hinge eye.

11. The spring hinge according to claim 1, wherein the hinge element is connected to a three-roller hinge part via the pair of webs and a connecting element.

12. The spring hinge according to claim 11, wherein the support element has a rolloff surface for a cam of the hinge part.

13. The spring hinge according to claim 1, wherein the hinge element is a punched part bent into a U shape.

14. The spring hinge according to claim 1, wherein the hinge element is made of a material having a uniform thickness and/or high strength and/or a rustproof design.

15. The spring hinge according to claim 1, further comprising a rolloff element, in the region of the open face section of the spring hinge, connected to the support element.

16. The spring hinge according to claim 15, wherein the rolloff element is made of a material having good rolloff characteristics.

17. The spring hinge according to claim 15, wherein the rolloff element projects beyond an end face of the housing.

18. The spring hinge according to claim 15, wherein the rolloff element is situated in a recess provided in the support element having a dovetail geometry.

19. The spring hinge according to claim 15, wherein the rolloff element is adhesively bonded to the support element.

20. The spring hinge according to claim 15, wherein the rolloff element is fastened, lasered or welded to the support element.

* * * * *